UNITED STATES PATENT OFFICE.

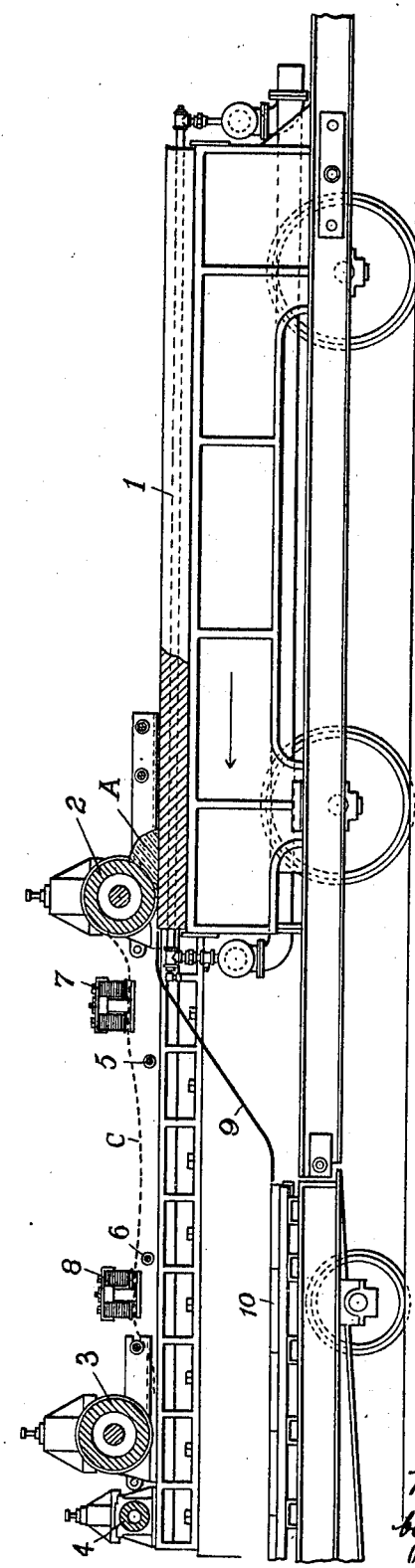

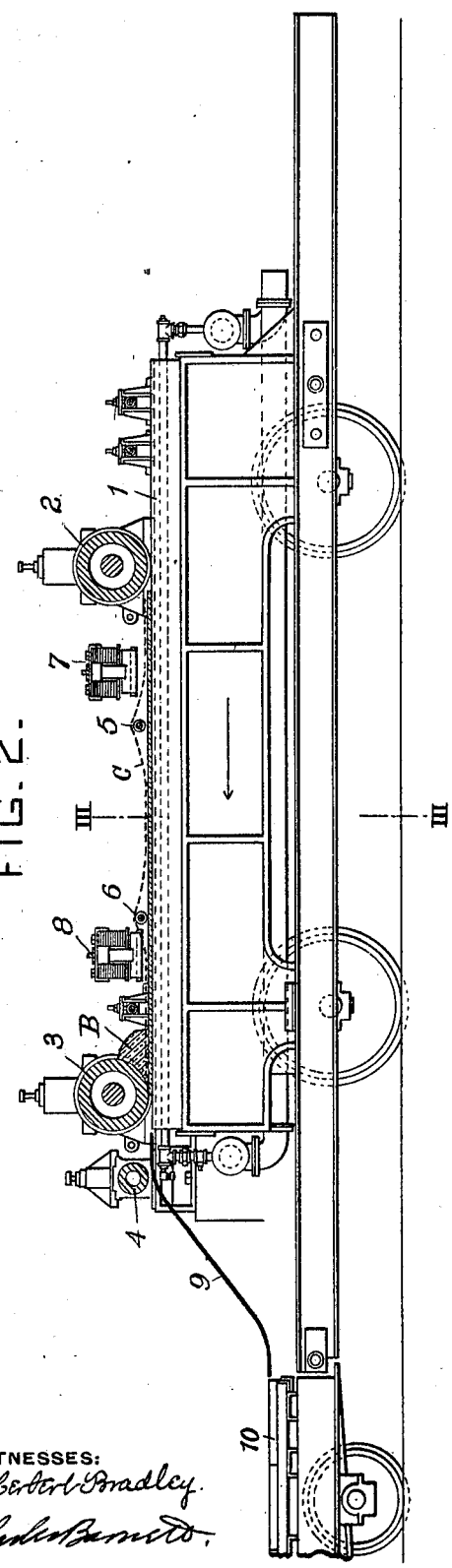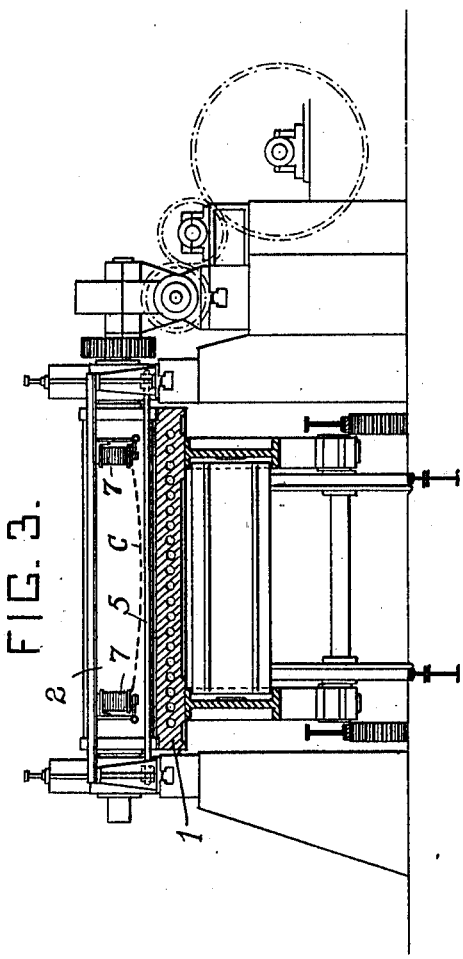

NICKLAS FRANZEN, OF WALTON, PENNSYLVANIA.

APPARATUS FOR MANUFACTURING WIRE-GLASS.

945,316.  Specification of Letters Patent.  Patented Jan. 4, 1910.

Application filed September 17, 1908. Serial No. 453,472.

*To all whom it may concern:*

Be it known that I, NICKLAS FRANZEN, residing at Walton, in the county of Allegheny and State of Pennsylvania, a citizen of the United States, have invented or discovered certain new and useful Improvements in Apparatus for Manufacturing Wire-Glass, of which improvements the following is a specification.

My invention relates to improvements in machines for making wire glass, and more particularly to machines in which successive layers are spread and united with a web of wire between them.

It has been proposed long since to make wire glass by spreading an initial layer of glass, applying to such newly spread layer a length of wire netting, and finally spreading a final finishing layer of glass upon the wire-covered initial layer. This operation must be performed comparatively slowly; the spreading of the initial layer must be done at slow speed, or, if rapidly spread, time must be allowed for the layer to cool somewhat from its highly heated state when newly spread, for, otherwise, the wire when applied to this initial layer will, before it can be covered, adhere at one point and another to the surface of the hot initial layer, and, expanding as it grows hot, will buckle beneath the batch of glass which advances over the wire-covered initial layer while being spread into a second layer thereon. This results in a defective article.

Different expedients have been resorted to, aside from the obvious one of allowing the initial layer to grow cool until the wire will slide freely upon it. That procedure is open to the objection that time is lost, and the speed of production reduced. One expedient is to positively sink the wire in the initial layer as the initial layer is formed, another is to feed the wire in approximately at the point where the second layer is spread upon the first. Another expedient is for the workmen to hold with their tools the free end of the wire which has been deposited on the initial layer and while the second layer is being spread, lifting and drawing it free from adhesion to the initial layer, and at the same time pulling it to take up thermal expansion.

My invention bears analogy to the expedient last described, in that I provide mechanism for doing automatically the same thing, that is, for progressively freeing the wire where it adheres to the initial layer and carrying the free end rearward to compensate for the thermal expansion or rendering it possible for the wire to be " ironed out " beneath the advancing wave of hot glass as the glass is being spread to form the second layer. It will be understood that such a procedure has its advantages over other operations which do not eliminate thermal expansion as a factor in that with such other operations the wire working within the finished sheet will produce unevenness of surface, but if the wire be expanded and can be smoothly spread on the initial layer while being inclosed the tendency to displacement within the glass will be reduced, and the finished product will be correspondingly better.

The mechanism which I use for doing the thing which I have described above is shown in preferred form in the accompanying drawings.

Figure 1 shows the machine partly in side elevation and partly in longitudinal section, when in operative position; Fig. 2 is a like view of the machine in another operative position; and Fig. 3 is a view in cross section, on the line III—III of Fig. 2.

In these drawings a casting table, 1, is shown, and two rolls, 2 and 3, which coöperate with the casting table to spread superposed layers of glass thereon. A third roll 4 traverses the newly completed sheet to reduce any surface unevenness which may exist. The rolls and the casting table have relative movement, so that the rolls successively traverse the surface of the table; and, to that end, the three rolls are conveniently mounted in stationary housings, and the table travels on wheels and tracks beneath.

The two rolls 2 and 3 are preferably though not necessarily separated by a distance slightly exceeding the length of the sheet of wire glass which is to be formed. Between these two rolls means are arranged for progressively detaching the web in case of adherence to an initial layer formed beneath the roll 2, so that as the wire expands under the heat of the glass and rises in wave-like manner from the surface of the layer, such waves or irregularities may be smoothed out by and in advance of the glass as it is spread to form the second layer; this end is effected by means which progressively raise the web of wire from the surface of the layer of glass on which it rests, carrying the excess in length rearward until it is eliminated as the free end of the wire rises from the surface of the glass.

The specific means which I preferably employ for accomplishing this result consist in a cross bar, such as 6, extending transversely slightly above the plane in which the table moves, with space enough between to permit the passage beneath it of the initial layer spread beneath roll 2. This cross bar may conveniently be a round steel bar two inches in diameter, more or less.

It will be understood that when the initial layer has been spread beneath roll 2 and approaches roll 3, and when a length of wire has been laid upon this initial layer this cross bar 6 interposed between wire and glass will in the further operation of the machine progressively separate the wire from the glass at points where it has adhered, and will shift the free portion of the web rearward as the wire expands, and thus prevent buckling.

As shown in the drawings, I preferably employ two such cross bars, 5 and 6; the number employed in any case will depend upon the distance between the glass-spreading rolls and the thickness of the initial layer. In making sheets ten feet long, and spacing rolls 2 and 3 slightly more than ten feet apart, I have found two cross bars arranged substantially as shown, adequate to accomplish the ends described.

I preferably employ, in coöperation with the mechanism described, means for sustaining the wire in elevated position above the plane in which the table progresses, until such time as the wire is to be applied to the glass, and for releasing the wire at the desired moment, that it may descend and rest upon the initial layer as the second layer is spread. My preferred means are shown in the drawing, and consist of electro magnets 7 and 8 (conveniently four in number) beneath the armatures of which the web of wire may be held near its four corners.

The operation of the machine will readily be understood. A length of wire, C, is cut and secured in position by the electro magnets 7 and 8, as indicated in Fig. 1. The table stands at the extreme right. A batch of glass is teemed upon the table to the right of and adjacent to roll 2. The table then moves to the left, as indicated in the drawing by an arrow, and as the table moves the batch of glass A is spread to a layer upon the casting table. As the table advances and the initial layer passes beneath cross bars 5 and 6 and approaches roll 3, the electro magnets are demagnetized and their armatures fall away (they are conveniently swung on hinges), and the web of wire falls and lies prone upon the initial layer, rising in wave-like form over the cross bars 5 and 6. The second batch of glass B is then teemed upon the wire-covered initial layer at a point adjacent to roll 3, and the continued progress of the table effects the completion of the sheet of wire glass in the well-known manner. As the second layer is spread, the initial layer advances beneath the cross bars and the web of wire advances above them, and thus the wire and glass are separated at points where they have adhered, and the excess in length of the wire produced by expansion is constantly worked backward until the free end of the wire is raised from the glass and the difficulty eliminated.

The bars 5 and 6 in addition to detaching the web from the initial layer and working it along to eliminate waves due to expansion, will also hold the web up from the initial layer thereby permitting a rearward movement of the web as the glass advances upon it.

At the forward end of the table is an incline 9, down which the finished sheet is dragged to a transfer table 10, whence it is delivered to the leers.

I claim as my invention:

1. In a machine for making wire glass, the combination with a casting table and means for spreading thereon superposed layers of glass, of means for progressively shifting portions of a web of wire lying upon the initial layer in advance of the formation of another layer thereon.

2. In a machine for making wire glass, the combination of a casting table, means for spreading thereon an initial layer of glass, means for depositing on such initial layer a web of wire, means for spreading a second layer of glass upon the wire covered initial layer, together with means for removing waves or irregularities in the web of wire when deposited upon the initial layer and before being covered by the glass of the second layer, substantially as described.

3. In a machine for making wire glass, the combination with a casting table, means for spreading thereon an initial layer of glass, and means for spreading a second layer of glass upon said initial layer, of means movable in relation to the casting table and operating in advance of the second layer-spreading means to progressively raise from the surface of the initial layer a web of wire previously laid thereon, substantially as described.

4. In a machine for making wire glass, the combination with a casting table, means for spreading thereon an initial layer of glass, and means for spreading a second layer of glass upon said initial layer, of a bar located between the two said glass-spreading means, extending in transverse direction above the surface of the casting table, and movable in relation to said casting table, substantially as described.

5. In a machine for making wire glass the combination of a casting table, two rolls immovable in relation to one another but movable in unison relatively to said casting table and arranged to spread thereon superposed layers of glass, and two bars located between the aforesaid rolls, immovable in relation to said rolls and extending in transverse direction above the plane of said casting table, over which bars a web of wire lying upon an initial layer of glass on said casting table will be raised in waves, substantially as described.

6. In a machine for making wire glass, the combination of a casting table, two glass spreading rolls, means for supporting and releasing a length of wire, and a cross bar, said casting table forming one element of the machine and the remaining parts enumerated above forming another element, and the two elements so designated being movable relative to one another in a direction of the length of the table; the two glass spreading rolls being arranged in transverse positions above the plane of the casting table to spread superposed layers of glass thereon, said cross bar being arranged in transverse position above the plane of the casting table and between the two said rolls to raise at one point in the form of a wave a length of wire laid upon an initial sheet of glass extending beneath said cross bar, and said means for supporting and releasing a length of wire being arranged between said glass spreading rolls to sustain a length of wire and deposit it at the proper moment in the operation of the machine upon an initial layer of glass extending upon the surface of the casting table between said casting rolls and beneath said cross bar, substantially as described.

7. In a machine for making wire glass, the combination of a casting table, means for spreading a layer of glass upon said casting table, and an electromagnet arranged above said casting table, having an armature hinged to its body magnetizable to clamp a web of wire netting between its core and armature and demagnetizable to allow the web of wire to fall to the casting table, substantially as described.

8. In a machine for making wire glass the combination of a pair of rolls separated from one another at a distance as great as the length of the sheet of wire glass to be formed, a casting table with which said rolls coöperate to spread superposed layers of glass, and means for sustaining a web of wire in substantially horizontal position between said rolls and for releasing said web of wire at a desired point in the operation of the machine, substantially as described.

In testimony whereof, I have hereunto set my hand.

NICKLAS FRANZEN.

Witnesses:
CHARLES BARNETT,
FRIEDA E. WOLFF.